US012784926B2

(12) United States Patent
Ueno et al.

(10) Patent No.: US 12,784,926 B2
(45) Date of Patent: Nov. 3, 2026

(54) RADIONUCLIDE PRODUCTION SYSTEM AND RADIONUCLIDE PRODUCTION METHOD

(71) Applicant: Hitachi High-Tech Corporation, Tokyo (JP)

(72) Inventors: Yuichiro Ueno, Tokyo (JP); Takahiro Tadokoro, Tokyo (JP); Mizuho Maeda, Tokyo (JP); Kento Nishida, Tokyo (JP); Takahiro Watanabe, Tokyo (JP); Takahiro Sasaki, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 242 days.

(21) Appl. No.: 18/689,113

(22) PCT Filed: Sep. 1, 2022

(86) PCT No.: PCT/JP2022/033013

§ 371 (c)(1),
(2) Date: Mar. 5, 2024

(87) PCT Pub. No.: WO2023/095410

PCT Pub. Date: Jun. 1, 2023

(65) Prior Publication Data

US 2024/0404721 A1 Dec. 5, 2024

(30) Foreign Application Priority Data

Nov. 25, 2021 (JP) ................................ 2021-191306

(51) Int. Cl.
*G21G 1/10* (2006.01)
*G21G 1/00* (2006.01)

(52) U.S. Cl.
CPC .............. *G21G 1/10* (2013.01); *G21G 1/001* (2013.01); *G21G 2001/0089* (2013.01)

(58) Field of Classification Search
CPC ... G21G 1/10; G21G 1/001; G21G 2001/0089
See application file for complete search history.

(56) References Cited

U.S. PATENT DOCUMENTS 3,204,101 A * 8/1965 Brumfield ............ G01J 3/2803 250/226
6,299,666 B1 * 10/2001 Apostolidis ............. G21G 1/10 376/125

(Continued)

FOREIGN PATENT DOCUMENTS

JP 2017156143 A 9/2017
JP 2018-507397 A 3/2018

(Continued)

OTHER PUBLICATIONS

Inagaki, Makoto, et al. "Production of99Mo/99mTc by photonuclear reaction using natMoO3 target." Journal of Radioanalytical and Nuclear Chemistry 324.2 (2020): 681-687. (Year: 2020).*

(Continued)

*Primary Examiner* — Lily C Garner
(74) *Attorney, Agent, or Firm* — MATTINGLY & MALUR, PC

(57) ABSTRACT

A radionuclide production system and method that is capable of improving a radionuclide production amount and supplying a radionuclide with less excess and deficiency when the radionuclide is produced is required. Included is a particle beam irradiation apparatus that generates a particle beam, a plurality of targets that generate the radionuclide by irradiation with the particle beam, and a separation refinement apparatus that separates and refines the radionuclide from the targets. The plurality of targets are divided into an irradiation target group subjected to an irradiation treatment of generating the radionuclide by irradiation with the particle beam and a refinement target group subjected to a separation refinement treatment of separating and refining (Continued)

the radionuclide from the targets. The irradiation target group and refinement target group are processed in parallel. In the radionuclide production method, the irradiation target group and refinement target group are processed in parallel to produce the radionuclide.

11 Claims, 4 Drawing Sheets

(56) References Cited

U.S. PATENT DOCUMENTS

| | | | | |
|---|---|---|---|---|
| 6,487,003 | B1 * | 11/2002 | Suzuki | G21K 1/06 372/99 |
| 9,170,217 | B2 * | 10/2015 | Chapman | G01N 23/20008 |
| 10,884,339 | B2 * | 1/2021 | Engelen | G01J 1/0407 |
| 11,170,907 | B2 * | 11/2021 | De Jager | G21G 1/12 |
| 2007/0092051 | A1 * | 4/2007 | Adelman | G21G 4/08 376/158 |
| 2010/0266083 | A1 * | 10/2010 | Bloomquist | G21G 4/02 376/202 |
| 2011/0096887 | A1 * | 4/2011 | Piefer | G21B 1/01 376/193 |
| 2012/0025105 | A1 * | 2/2012 | Brown | G21G 1/12 250/492.3 |
| 2013/0114775 | A1 * | 5/2013 | Howe | G21G 1/001 376/182 |
| 2016/0111176 | A1 * | 4/2016 | Nolen, Jr. | G21G 1/10 376/194 |
| 2016/0189816 | A1 | 6/2016 | Czerwinski et al. | |
| 2016/0225477 | A1 * | 8/2016 | Banine | G02B 27/0025 |
| 2017/0251547 | A1 | 8/2017 | Ito | |
| 2019/0043631 | A1 | 2/2019 | Matsuzaki et al. | |
| 2019/0066859 | A1 * | 2/2019 | De Jager | G21G 1/10 |
| 2022/0199277 | A1 * | 6/2022 | Tadokoro | G21G 1/12 |
| 2022/0208409 | A1 | 6/2022 | Kani et al. | |

FOREIGN PATENT DOCUMENTS

| | | | | |
|---|---|---|---|---|
| JP | 2020183926 | A * | 11/2020 | G21G 1/12 |
| JP | 2021-004807 | A | 1/2021 | |
| WO | 2016/108939 | A2 | 7/2016 | |
| WO | 2017/135196 | A1 | 8/2017 | |
| WO | WO-2020225951 | A1 * | 11/2020 | G21G 1/12 |

OTHER PUBLICATIONS

International Search Report of PCT/JP2022/033013 dated Nov. 1, 2022.

Written Opinion of the International Searching Authority of PCT/JP2022/033013 dated Nov. 1, 2022.

Extended European Search Report received in corresponding European Application No. 22898195.7 dated Nov. 5, 2025.

* cited by examiner

[FIG. 1]
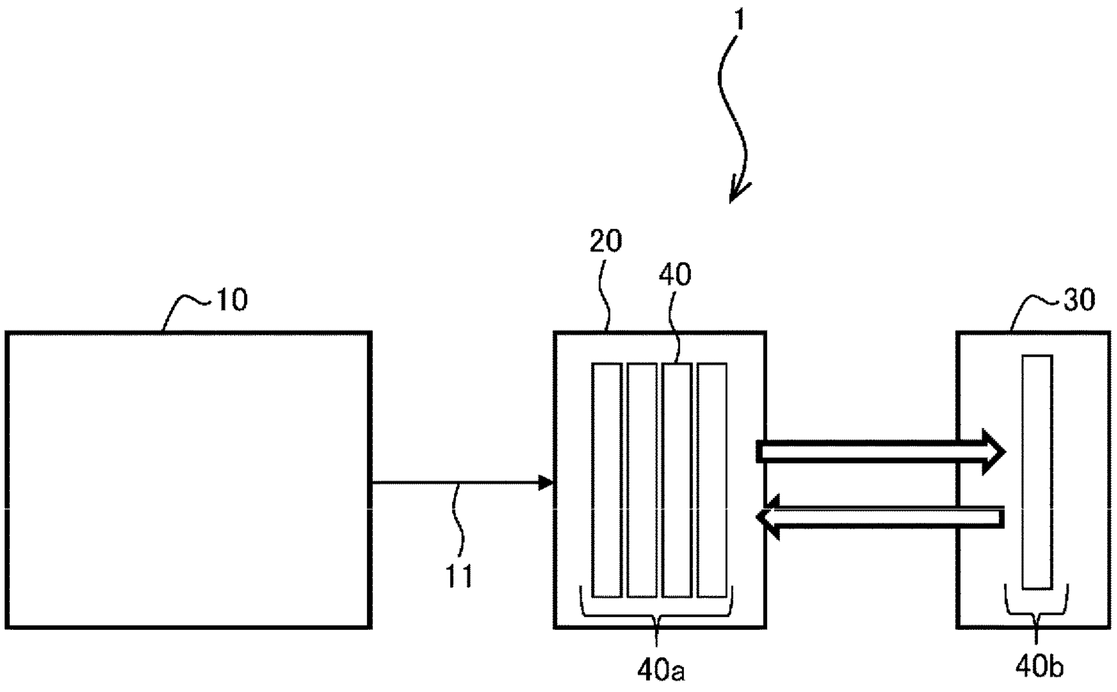

[FIG. 2]
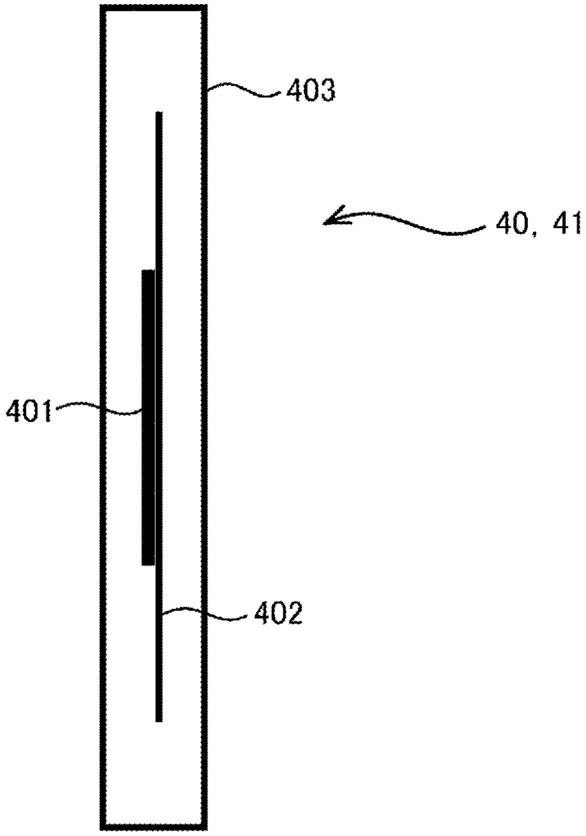
[FIG. 3]
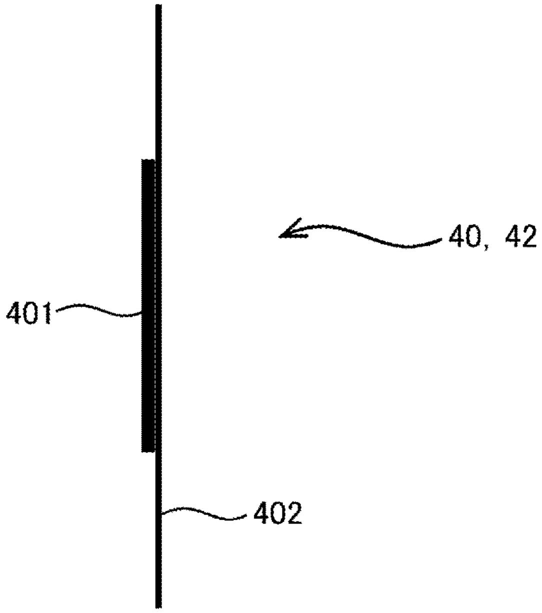

[FIG. 4]
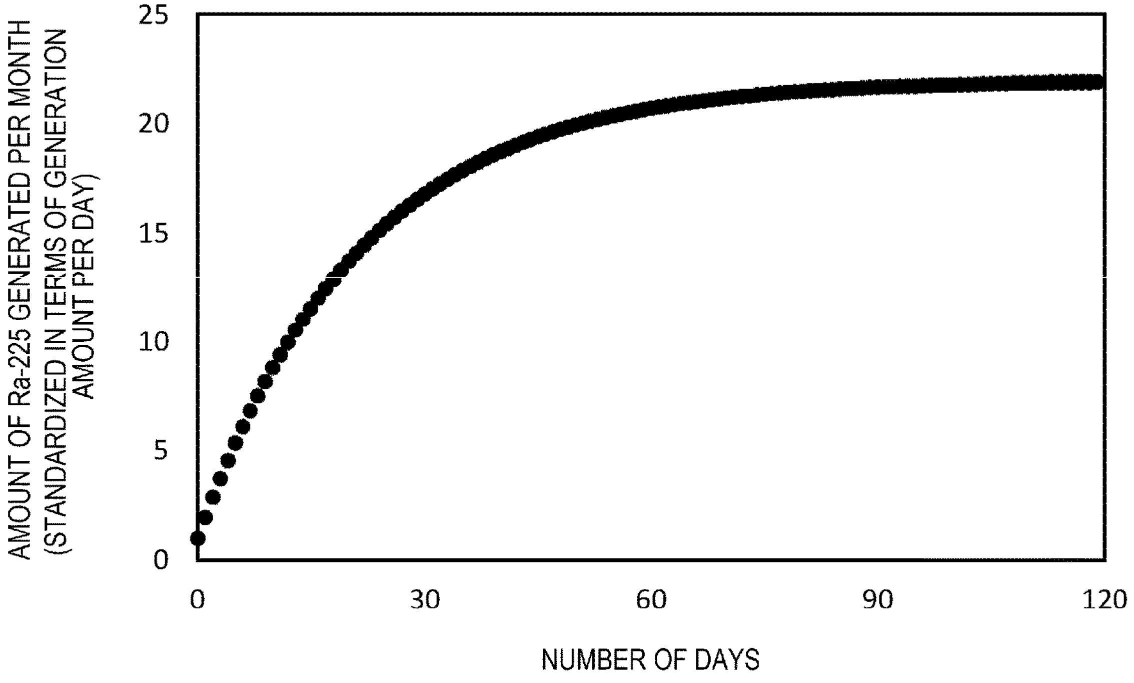
[FIG. 5]
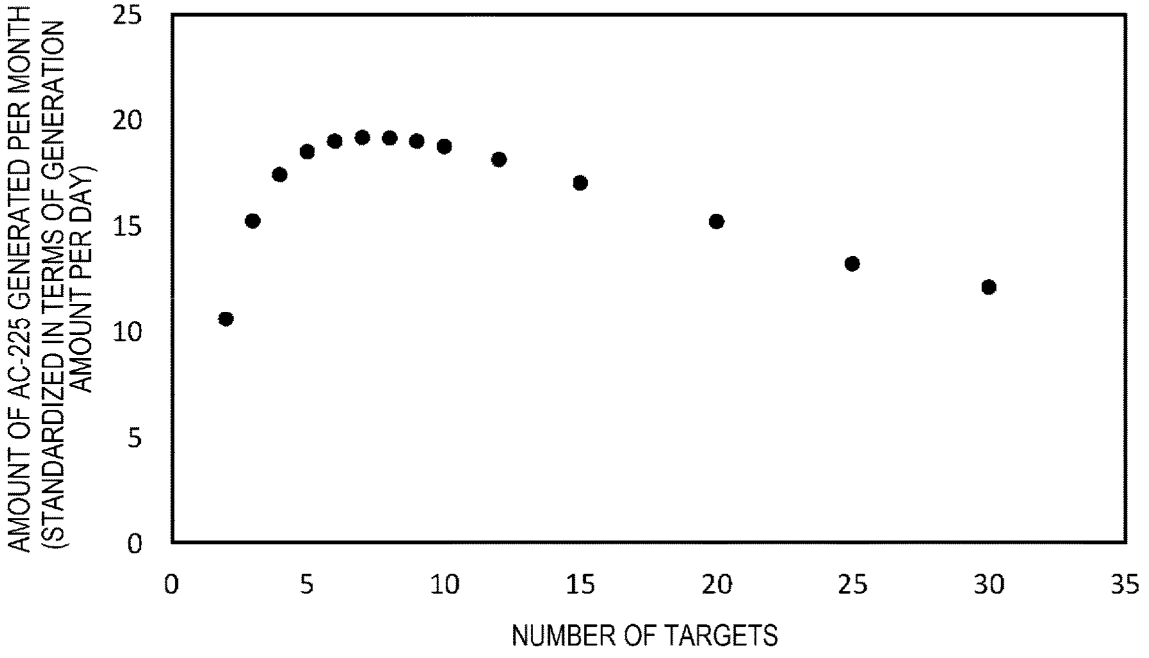

[FIG. 6]
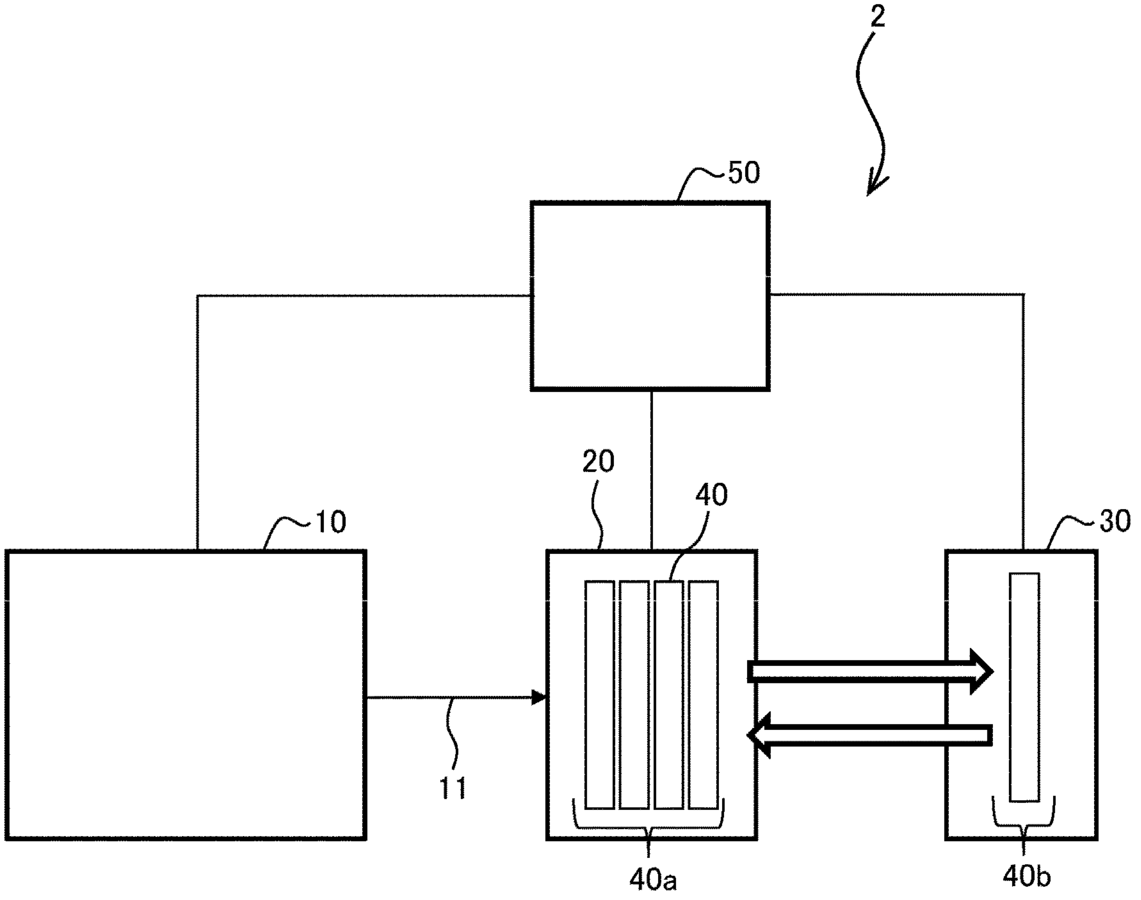

RADIONUCLIDE PRODUCTION SYSTEM AND RADIONUCLIDE PRODUCTION METHOD

TECHNICAL FIELD

The present invention relates to a radionuclide production system and a radionuclide production method for processing a plurality of targets in parallel with the targets divided into an irradiation target group and a refinement target group.

BACKGROUND ART

Conventionally, a radionuclide has been used for a nuclear medicine diagnosis. As a diagnostic method using the radionuclide as a label, e.g., positron emission tomography (PET) or single photon emission computed tomography (SPECT) has been performed.

In recent years, in addition to such a nuclear medicine diagnosis, a radionuclide therapy using the radionuclide for treatment has attracted attention. The radionuclide therapy is a treatment method in which the radionuclide is incorporated into a medical agent selectively accumulated on a desired tissue such as cancer, the medical agent is administered into a body, and the desired tissue is directly irradiated with a radiation.

The conventional radionuclide therapy uses a β-ray source, and in old days, a gland cancer treatment using I-131 has been performed since 1940s. On the other hand, in recent years, a radionuclide therapy using an α-ray source with a short range and a high linear energy has attracted attention in terms of a high treatment effect.

An α-emitting radionuclide used for the radionuclide therapy includes, e.g., actinium 225 (Ac-225), radium 223 (Ra-223), and astatine 211 (At-211). Particularly, a daughter nuclide of Ac-225 is also an α-emitting radionuclide, and can produce a high treatment effect by a maximum of four decays.

Conventionally, actinium 225 (Ac-225) is produced from thorium 229 (Th-229) by decay. Th-229 does not exist in nature, and is generated from uranium 233 (U-233) by decay. However, there have been concerns about an insufficient supply amount due to physical protection, and therefore, there has been a demand for production of such a substance by an accelerator.

A method for producing Ac-225 using the accelerator has a production problem. There is a problem that the range of a proton accelerated by a cyclotron in Ra-226 is short, and for this reason, a great amount of Ac-225 cannot be produced even in a thick target. Almost all proton energy is lost in the target, and it is difficult to increase the proton energy as compared to the related art because it is difficult to sufficiently remove heat from the target.

Patent Literature 1 describes a radionuclide production apparatus for efficiently producing a desired radionuclide in less target material under the limitation that a particle beam heat load is cooled. This apparatus includes a plurality of target material plates arranged so as to overlap with each other to generate the radionuclide, and is configured to generate the radionuclide by irradiation of the target material plates with a particle beam.

CITATION LIST

Patent Literature

PTL 1: JP2017-156143A

SUMMARY OF INVENTION

Technical Problem

In Patent Literature 1, the diameter or average thickness of the plurality of target material plates is adjusted for efficiently producing the desired radionuclide in less target material under the limitation that the particle beam heat load is cooled. However, Patent Literature 1 fails to consider a treatment of separating and refining the desired radionuclide from the target material plates. It takes time to perform the radionuclide separation refinement treatment, and for this reason, under the present circumstances, it is difficult to improve a radionuclide production amount and supply the radionuclide with less excess and deficiency when the radionuclide is required.

Thus, the present invention is intended to provide a radionuclide production system and a radionuclide production method capable of improving the radionuclide production amount and supplying the radionuclide with less excess and deficiency when the radionuclide is required.

Solution to Problem

In order to solve the above-described problem, the radionuclide production system according to the present invention is a radionuclide production system for generating, separating, and refining a radionuclide, the radionuclide production system including a particle beam irradiation apparatus that generates a particle beam, a plurality of targets that generates the radionuclide by irradiation with the particle beam, and a separation refinement apparatus that separates and refines the radionuclide from the targets. The plurality of targets is divided into an irradiation target group subjected to an irradiation treatment of generating the radionuclide by irradiation with the particle beam and a refinement target group subjected to a separation refinement treatment of separating and refining the radionuclide from the targets, and the irradiation target group and the refinement target group are processed in parallel.

The radionuclide production method according to the present invention is a radionuclide production method for generating, separating, and refining a radionuclide, the radionuclide production method including an irradiation treatment of generating the radionuclide in a target by irradiation with a particle beam and a separation refinement treatment of separating and refining the radionuclide from the target. The target includes a plurality of targets divided into an irradiation target group subjected to the irradiation treatment and a refinement target group subjected to the separation refinement treatment, and the irradiation target group and the refinement target group are processed in parallel to produce the radionuclide.

Advantageous Effects of Invention

According to the present invention, the radionuclide production system and the radionuclide production method can be provided, which are capable of improving the radionuclide production amount and supplying the radionuclide with less excess and deficiency when the radionuclide is required.

BRIEF DESCRIPTION OF DRAWINGS

FIG. 1 is a diagram showing the configuration of a radionuclide production system according to a first embodiment.

FIG. 2 is a view for describing the structure of a hermetic target.

FIG. 3 is a view for describing the structure of a non-hermetic target.

FIG. 4 is a graph showing a calculation result of a relationship between the amount of Ra-225 generated and the number of days of a treatment when an irradiation treatment and a separation refinement treatment are repeated.

FIG. 5 is a graph showing a calculation result of a relationship between the amount of Ac-225 generated and the number of targets when the irradiation treatment and the separation refinement treatment are repeated.

FIG. 6 is a diagram showing the configuration of a radionuclide production system according to a second embodiment.

DESCRIPTION OF EMBODIMENTS

Hereinafter, a radionuclide production system and a radionuclide production method according to one embodiment of the present invention will be described with reference to the figures. Note that in each figure below, the same reference numerals are used to represent common components and overlapping description thereof will be omitted.

First Embodiment

FIG. 1 is a diagram showing the configuration of a radionuclide production system according to a first embodiment.

As shown in FIG. 1, the radionuclide production system 1 according to the first embodiment includes a particle beam irradiation apparatus 10, an irradiation portion 20, a separation refinement apparatus 30, and a plurality of targets 40. In the system, the plurality of targets 40 is divided into an irradiation target group 40*a* and a refinement target group 40*b*.

The radionuclide production system 1 is an apparatus that produces a predetermined radionuclide by nuclear transformation of a raw nuclide by nuclear reaction. The nuclear reaction of the raw nuclide is initiated by irradiation of the raw nuclide with a particle beam or a bremsstrahlung radiation. In the radionuclide production system 1, the transportable target 40 is used as a production unit in production of the radionuclide. The raw nuclide to be nuclear-transformed into the predetermined radionuclide by the nuclear reaction is held in a predetermined chemical form on the target 40.

The radionuclide production method using the radionuclide production system 1 includes a step of arranging the plurality of targets 40 with the targets 40 divided into the irradiation target group 40*a* and the refinement target group 40*b*, a step of performing an irradiation treatment of generating the radionuclide in the target 40 of the irradiation target group 40*a* by irradiation with a particle beam 11, and a step of performing a separation refinement treatment of separating and refining the radionuclide from the target 40 of the refinement target group 40*b*.

The particle beam irradiation apparatus 10 generates, upon production of the radionuclide, the particle beam 11 required for the nuclear reaction of the raw nuclide and irradiates the irradiation portion 20 with the particle beam 11. The irradiation portion 20 is a portion to be irradiated with the particle beam 11. The target 40 including the raw nuclide is arranged in the irradiation portion 20, and is subjected to the irradiation treatment. One or more targets 40 are arranged in the irradiation portion 20. The target 40 arranged in the irradiation portion 20 forms the irradiation target group 40*a* to be collectively subjected to the irradiation treatment.

The irradiation treatment is a treatment of generating the radionuclide in the target 40 by irradiation with the high-energy particle beam 11 generated by the particle beam irradiation apparatus 10. In the irradiation treatment, the raw nuclide included in the target 40 is irradiated with a particle beam or a bremsstrahlung radiation having an energy of a nuclear reaction threshold or more. The raw nuclide is nuclear-transformed into the predetermined radionuclide by the nuclear reaction by irradiation with the particle beam or the bremsstrahlung radiation.

Depending on, e.g., the nuclear reaction to be used, the raw nuclide may be irradiated with the particle beam 11 generated by the particle beam irradiation apparatus 10, or may be irradiated with a bremsstrahlung radiation generated in such a manner that a target material for generating a bremsstrahlung radiation is irradiated with the particle beam 11 generated by the particle beam irradiation apparatus 10. The target material for generating the bremsstrahlung radiation can be arranged in the irradiation portion 20, or can be used as a material forming the target 40.

The separation refinement apparatus 30 is an apparatus that separates and refines the predetermined radionuclide from the target 40. A part of the irradiation target group 40*a* are delivered to the separation refinement apparatus 30 after having been subjected to the irradiation treatment. The target 40 in which the predetermined radionuclide has been generated by the nuclear reaction is arranged in the separation refinement apparatus 30, and is subjected to the separation refinement treatment. One or more targets 40 are arranged in the separation refinement apparatus 30. The target 40 arranged in the separation refinement apparatus 30 forms the refinement target group 40*b* to be collectively subjected to the separation refinement treatment.

The separation refinement treatment is a treatment of separating and refining the desired radionuclide from the target 40. In the separation refinement treatment, the raw material including the predetermined radionuclide generated by the irradiation treatment is separated from the target 40. Then, the desired radionuclide included in the separated raw material is refined as a substance in an appropriate chemical form. The target 40 of the refinement target group 40*b* can be reused, after having been subjected to the separation refinement treatment, in a state in which the raw material including the raw nuclide is held thereon.

In the radionuclide production system 1, the plurality of targets 40 is utilized at the same timing upon production of the radionuclide. After the irradiation treatment, some of the plurality of targets 40 are arranged as the refinement target group 40*b* in the separation refinement apparatus 30, and are subjected to the separation refinement treatment. The remaining ones of the plurality of targets 40 are arranged as the irradiation target group 40*a* in the irradiation portion 20, and are subjected to the irradiation treatment. The irradiation target group 40*a* and the refinement target group 40*b* are processed in parallel at the same timing. Some of the plurality of targets 40 can be provided for a certain production request for production of a predetermined desired supply amount of radionuclide at future predetermined desired supply timing, and the remaining ones of the plurality of targets 40 can be provided for another production request.

The irradiation treatment and the separation refinement treatment can be repeated in units of predetermined time.

The time unit of the treatment may be, e.g., a time unit of within 1 to 24 hours or a unit of 1 day according to, e.g., the desired radionuclide to be produced or the method to be used for the separation refinement treatment. In every treatment performed in units of predetermined time, the irradiation treatment and the separation refinement treatment can be performed once in parallel, and some targets 40 can be replaced between the irradiation target group 40*a* and the refinement target group 40*b*.

At the time of the end of the treatment performed in units of predetermined time, the target 40 in which a predetermined amount of radionuclide or more has been generated among the targets 40 of the irradiation target group 40*a* subjected to the irradiation treatment can be transferred to the refinement target group 40*b*. The target 40 of the refinement target group 40*b* subjected to the separation refinement treatment can be returned to the irradiation target group 40*a* with holding the raw material including the raw nuclide. Alternatively, the target 40 subjected to the separation refinement treatment can be removed, and a new target 40 holding the raw material including the raw nuclide can be added to the irradiation target group 40*a*.

The total number of targets 40 utilized in the system is preferably maintained constant throughout repetition of the treatment. With the constant total number of targets 40, the production amount of radionuclide per treatment can be easily controlled in a case where the distribution ratio of the targets 40 between the irradiation target group 40*a* and the refinement target group 40*b* and an irradiation condition for the particle beam 11 are selected. Moreover, the rate of utilization of the target 40 in the system increases, and therefore, a radionuclide production cost is reduced.

The target 40 can hold the raw material including the raw nuclide and formed in the appropriate chemical form. The raw material may be any of a solid, liquid, and gas. As the raw nuclide, an appropriate nuclide can be used according to the desired radionuclide to be produced. Specific examples of the raw nuclide include radium-226 (Ra-226), molybdenum-100 (Mo-100), zinc-68 (Zn-68), hafnium-178 (Hf-178), and germanium-70 (Ge-70).

As the nuclear reaction for nuclear-transforming the raw nuclide, appropriate nuclear reaction which includes, e.g., photonuclear reaction by a bremsstrahlung radiation, such as ($\gamma$,n), ($\gamma$,p), ($\gamma$,2n), or ($\gamma$,pn), and nuclear reaction by a particle beam such as a charged particle beam or a heavy particle beam can be used according to, e.g., the desired radionuclide to be produced, the type of raw nuclide, and a required energy.

The radionuclide to be produced in the radionuclide production system 1 is not particularly limited. As the radionuclide to be produced, an $\alpha$-emitting radionuclide, a $\beta$-emitting radionuclide, or a $\gamma$-emitting radionuclide is preferred and the $\alpha$-emitting radionuclide is particularly preferred in terms of availability as, e.g., a raw material of a therapeutic agent to be used for a radionuclide therapy or a radiolabeling reagent to be used for a radioactive diagnosis. The radionuclide to be produced may be a daughter nuclide generated by nuclear reaction of a raw nuclide, or may be a progeny nuclide generated by radioactive decay of a daughter nuclide after nuclear reaction of a raw nuclide.

As the particle beam irradiation apparatus 10, an apparatus including a beam source that generates a charged particle such as an electron and an accelerator that accelerates the charged particle is preferred in terms of the high-energy particle beam 11 being able to be generated by a small apparatus. As the accelerator, an appropriate apparatus such as a linear accelerator can be used according to, e.g., the type of radionuclide to be produced and the nuclear reaction to be used.

The irradiation portion 20 may include, e.g., a holder capable of supporting the plurality of targets 40 and a hermetic container capable of housing the plurality of targets 40. In the irradiation portion 20, the irradiation treatment with the particle beam 11 is simultaneously performed on the one or more targets 40 forming the irradiation target group 40*a*. In a case where the raw nuclide included in the target 40 is irradiated with the bremsstrahlung radiation, the target material for generating the bremsstrahlung radiation can be arranged together with the holder, or may be provided as part of the hermetic container.

The separation refinement apparatus 30 performs, e.g., a treatment of separating the substance including the radionuclide and formed in the predetermined chemical form from the target 40, a treatment of separating the predetermined radionuclide from the substance in the predetermined chemical form, and a treatment of refining the substance including the radionuclide and formed in the predetermined chemical form. In the separation refinement apparatus 30, the radionuclide separation refinement treatment can be simultaneously or sequentially performed on the one or more targets 40 forming the refinement target group 40*b*.

As a separator that performs the separation treatment in the separation refinement apparatus 30, e.g., an automated apparatus that recovers the raw material from the target 40 or a dissolving apparatus that dissolves the raw material can be provided according to the chemical form of the raw material held on the target 40. As a refiner that performs the refinement treatment in the separation refinement apparatus 30, e.g., a chromatograph, a centrifugal separator, a precipitator, or an evaporative separator can be provided according to the radionuclide to be refined.

The target 40 can be automatically or manually delivered between the irradiation portion 20 and the separation refinement apparatus 30. The target 40 can be automatically delivered by an appropriate automatic delivery apparatus such as a robot arm or a conveyer. The raw material which is the minimum unit to be handled in the irradiation treatment and the separation refinement treatment is held on the target 40.

FIG. 2 is a view for describing the structure of a hermetic target. FIG. 3 is a view for describing the structure of a non-hermetic target.

As shown in FIGS. 2 and 3, the target 40 may be a hermetic target 41 holding a raw material 401 including a raw nuclide with the raw material 401 housed in a container, or may be a non-hermetic target 42 holding a raw material 401 including a raw nuclide in an exposed state without the raw material 401 housed in a container.

For example, in a case of producing Ac-225, a substance including Ra-226 and formed in an appropriate chemical form can be used as the raw material 401. Ra-226 turns into Ra-225 by Ra-226($\gamma$,n)Ra-225 reaction. Ra-225 turns into Ac-225 by $\beta$-decay in a half-life of 14.9 days. Ra-226 turns into Rn-222 by $\alpha$-decay. Rn-222 which is noble gas easily circumferentially spreads, and therefore, the raw material 401 is preferably sealed.

The hermetic target 41 includes the raw material 401 including the raw nuclide, a raw material holding plate 402 provided as a plate-shaped cartridge, and an openable hermetic container 403 capable of airtightly sealing the raw material 401 etc. therein. The raw material 401 is held on the raw material holding plate 402. The raw material holding plate 402 is housed in the hermetic container 403. In the hermetic container 403, a plurality of raw material holding plates 402 can be housed with overlapping with each other along the direction of irradiation with the particle beam 11.

According to the hermetic target 41, leakage of a gaseous radioactive substance can be prevented in units of targets in a case where the gaseous radioactive substance is generated by nuclear reaction or radioactive decay. Upon delivery of the target 40, the raw nuclide or the radionuclide generated by the nuclear reaction can be safely handled in units of targets. Note that in the hermetic target 41, one raw material holding plate 402 may be housed or a plurality of raw material holding plates 402 may be housed.

The non-hermetic target 42 includes the raw material 401 including the raw nuclide and a raw material holding plate 402 provided as a plate-shaped cartridge. The raw material 401 is held on the raw material holding plate 402. The non-hermetic target 42 is preferably housed in the irradiation portion 20 having a hermetic structure in a case where a gaseous radioactive substance is generated by nuclear reaction or radioactive decay. In the irradiation portion 20 having the hermetic structure, a plurality of raw material holding plates 402 can be housed with overlapping with each other along the direction of irradiation with the particle beam 11.

According to the non-hermetic target 42, the particle beam 11 generated by the particle beam irradiation apparatus 10 is not attenuated by the hermetic container 403, and the raw material 401 can be irradiated with a high dose of beams. In a case of reusing the target 40 subjected to the separation refinement treatment, an operation of separating the raw material 401 from the hermetic container 403 and an operating of holding the raw material 401 in the hermetic container 403 again are not required. Thus, the treatment of reusing the target 40 can be easily automated.

As shown in FIG. 1, the targets 40 of the irradiation target group 40*a* arranged so as to overlap with each other are preferably irradiated with the particle beam 11 generated by the particle beam irradiation apparatus 10 such that the particle beam 11 crosses these targets 40. By such irradiation, in the plurality of targets 40, the nuclear reaction of the raw nuclide can be initiated, and in this manner, the predetermined radionuclide can be generated.

In a case of irradiating the raw nuclide included in the target 40 with the bremsstrahlung radiation, the target material for generating the bremsstrahlung radiation can be placed on an incident side in the direction of irradiation with the particle beam 11 with respect to the irradiation target group 40*a* in the irradiation portion 20. Alternatively, the target material for generating the bremsstrahlung radiation can be used as the raw material 401 of the target 40 or the material of the raw material holding plate 402 or the hermetic container 403.

As the target material for generating the bremsstrahlung radiation, a substance having a great atomic number and having a high density can be used. The target material for generating the bremsstrahlung radiation includes tungsten (W), tantalum (Ta), lead (Pb), bismuth (Bi), and a platinum group such as platinum (Pt), rhodium (Rh), palladium (Pd), ruthenium (Ru), and iridium (Ir).

In a case where the target material for generating the bremsstrahlung radiation is placed on the incident side in the direction of irradiation with the particle beam 11 in the irradiation portion 20, the particle beam 11 enters the target material provided on the incident side in the irradiation portion 20, and the bremsstrahlung radiation is emitted accordingly. On the other hand, in a case where the target material for generating the bremsstrahlung radiation is used as the material of the target 40, the particle beam 11 enters the target material of the foremost target 40 arranged closest to the incident side in the direction of irradiation with the particle beam 11, and the bremsstrahlung radiation is emitted accordingly. In a case where the particle beam 11 has penetrated the foremost target 40, the particle beam 11 enters the target material of the subsequent targets 40, and a lower dose of bremsstrahlung radiation than that from the foremost target 40 is emitted accordingly.

In any case, among the targets 40 of the irradiation target group 40*a*, the raw nuclide of the foremost target 40 arranged closest to the incident side in the direction of irradiation with the particle beam 11 is irradiated with the bremsstrahlung radiation. In a case where the bremsstrahlung radiation has penetrated, e.g., the foremost target 40, the raw nuclide of the subsequent targets 40 is also irradiated with the bremsstrahlung radiation. The closer the target 40 is arranged to the incident side, the more radionuclide is generated per unit raw nuclide amount by the nuclear reaction.

The particle beam 11 such as a charged particle has a low penetrating power, and is easily blocked by a structure. On the other hand, the bremsstrahlung radiation has a high penetrating power, and is less likely to be blocked by a structure. Thus, in a case where the target material for generating the bremsstrahlung radiation is placed on the incident side in the direction of irradiation with the particle beam 11 in the irradiation portion 20, the amount of radionuclide generated in the subsequent targets 40 can be increased as compared to a case where the target material is used as the raw material 401 of the target 40 or the material of the raw material holding plate 402 or the hermetic container 403.

The plurality of targets 40 utilized in the system can be arranged, for each treatment, with an appropriate distribution ratio between the irradiation target group 40*a* and the refinement target group 40*b*. The distribution ratio of the targets 40 between the irradiation target group 40*a* and the refinement target group 40*b* can be selected according to, e.g., desired radionuclide supply timing, a desired radionuclide supply amount, and the stability of the raw nuclide and the generated nuclide.

The number of targets 40 forming the irradiation target group 40*a* and the number of targets 40 forming the refinement target group 40*b* are not particularly limited as long as these numbers are one or more. The number of targets 40 forming the irradiation target group 40*a* is preferably greater than the number of targets 40 forming the refinement target group 40*b*. The total number of targets 40 of the irradiation target group 40*a* and the refinement target group 40*b* is preferably 10 or less.

Generally, a time required for the separation refinement treatment is less likely to depend on a radionuclide separation refinement amount, and on the other hand, is longer as compared to a time required for the irradiation treatment. In a case where the number of targets 40 of the irradiation target group 40*a* is greater than the number of targets 40 of the refinement target group 40*b*, a predetermined separation refinement amount can be continuously ensured while the amount of radionuclide generated by the nuclear reaction is increased.

Among the targets 40 of the irradiation target group 40*a* subjected to the irradiation treatment, the target 40 having a great amount of radionuclide generated by the nuclear reaction is preferably transferred to the refinement target group 40*b*. For example, the foremost target 40 arranged on the incident side in the direction of irradiation with the particle beam 11 or a plurality of targets 40 arranged on the incident side in the direction of irradiation with the particle beam 11 can be delivered to the separation refinement apparatus 30 from the irradiation portion 20.

Upon production of the radionuclide, the amount of radionuclide generated by the nuclear reaction, the amount of unreacted raw nuclide remaining after the nuclear reaction, and the amount of radionuclide separated and refined from the target 40 are preferably measured over time. The radionuclide amount can be measured by a gamma counter using, e.g., a scintillation detector or a semiconductor detector.

In a case where the radionuclide amount is measured over time, not only general production management can be performed, but also a condition for the target 40, such as the number, configuration, and arrangement of the targets 40, and a condition for irradiation with the particle beam 11 can be selected according to the state of the target 40. These parameters can be changed in every treatment according to, e.g., the desired radionuclide supply timing, the desired radionuclide supply amount, and the stability of the raw nuclide and the radionuclide.

FIG. 4 is a graph showing a calculation result of a relationship between the amount of Ra-225 generated and the number of days of the treatment when the irradiation treatment and the separation refinement treatment are repeated. FIG. 5 is a graph showing a calculation result of a relationship between the amount of Ac-225 generated and the number of targets when the irradiation treatment and the separation refinement treatment are repeated.

FIG. 4 shows the relationship between the amount of Ra-225 generated by Ra-226(γ,n)Ra-225 reaction and the number of days for which the irradiation treatment and the separation refinement treatment are repeated. FIG. 5 shows the relationship between the amount of Ac-225 generated by Ra-226(γ,n)Ra-225 reaction and β-decay and the total number of targets provided for the irradiation treatment and the separation refinement treatment.

In FIGS. 4 and 5, the radionuclide generation amount was calculated assuming a parallel treatment in which the irradiation treatment and the separation refinement treatment are repeated in units of days. The radionuclide generation amount was calculated in units of days. For example, it is assumed that the time of the irradiation treatment per day is 12 hours, the time of the separation refinement treatment per day is 24 hours, and these treatments are repeated in units of days.

Among the plurality of targets 40, one target 40 was assigned to the refinement target group 40*b* per day, and the remaining targets 40 were assigned to the irradiation target group 40*a*. It is assumed that in every 24 hours, one target 40 in which the maximum amount of radionuclide has been generated among the targets 40 of the irradiation target group 40*a* subjected to the irradiation treatment is transferred to the refinement target group 40*b* and the target 40 in which the raw nuclide has been reproduced is returned to the irradiation target group 40*a*.

It is assumed that the amount of Ra-225 generated increases by nuclear reaction of Ra-226 which is the raw nuclide and decreases by radioactive decay of Ra-225. It is assumed that the amount of Ac-225 generated increases by nuclear reaction of Ra-226 which is the raw nuclide and β-decay of Ra-225 and decreases by radioactive decay of Ac-225. It is assumed that the nuclear reaction and the radioactive decay occurs at a certain rate of occurrence in repetition of the treatment.

In FIG. 4, the vertical axis indicates the amount of Ra-225 generated per month, which is standardized in terms of the generation amount per day (normalized with the generation amount per day as 1). The horizontal axis indicates the number of days for which the irradiation treatment and the separation refinement treatment are repeated. As shown in FIG. 4, the amount of Ra-225 generated per month increases as the irradiation treatment and the separation refinement treatment are repeated. However, it shows that when the number of days of the treatment exceeds about 90 days, the generation amount is saturated and is less likely to increase.

The amount of Ra-225 generated per month is saturated because Ra-225 generated by the nuclear reaction turns into Ac-225 by β-decay. As the number of days of the treatment increases, the amount of Ra-225 generated per day and the amount of decay of Ra-225 per day becomes equal to each other, and the amount of Ra-225 generated per month is peaked out.

In FIG. 5, the vertical axis indicates the amount of Ac-225 generated per month, which is standardized in terms of the generation amount per day (normalized with the generation amount per day as 1). The horizontal axis indicates the total number of targets 40 of the irradiation target group 40*a* and the refinement target group 40*b*. While the total number of targets 40 changes, the total amount of Ra-226 which is the raw nuclide is constant. As shown in FIG. 5, the amount of Ac-225 generated per month increases with an increase in the number of targets 40. However, after a certain number, the generation amount decreases. It shows that the amount of Ac-225 generated per month is the maximum value in a case where the total number of targets 40 is 10 or less.

The amount of Ac-225 generated per month increases because the amount of Ra-226 subjected to the irradiation treatment per day increases with an increase in the number of targets 40. One target 40 is assigned to the refinement target group 40*b* per day. Thus, as the total number of targets 40 increases, the targets 40 of the irradiation target group 40*a* increases in number, and the amount of raw nuclide subjected to the irradiation treatment per day increases.

For example, in a case where the total number of targets 40 is two, when one target 40 is assigned to the refinement target group 40*b* per day, one target 40 is assigned to the irradiation target group 40*a*. Only the half of the raw nuclide whose total amount is constant is subjected to the irradiation treatment. In terms of the amount of radionuclide generated by the nuclear reaction and the rate of transformation of the raw nuclide, the total number of targets 40 is preferably great to some extent for a predetermined amount of raw nuclide prepared for production of the radionuclide.

The amount of Ac-225 generated per month is the maximum value in a case where the total number of targets 40 is 10 or less because the half-life of Ac-225 is short, which is 10.0 days, with respect to the treatment repeated in units of days. Since one target 40 is assigned to the refinement target group 40*b* per day, an interval of one target 40 being repeatedly subjected to the separation refinement treatment increases and the radionuclide production amount decreases in a case where the total number of targets 40 is too great.

Thus, the irradiation treatment is preferably repeated multiple times according to the half-life of the radionuclide such that the amount of radionuclide generated by the nuclear reaction is saturated as shown in FIG. 4, in terms of improvement in the radionuclide production amount. Moreover, the total number of targets 40 is preferably made sufficiently small in consideration of, e.g., the time interval of the separation refinement treatment to which the target 40 is subjected and the length of the unit time of the treatment with respect to the half-life of the radionuclide such that the radionuclide separation refinement amount does not decrease as shown in FIG. 5.

Conventionally, various radionuclides have been used as, e.g., a raw material of a therapeutic agent or a radiolabeling reagent to be used for a radionuclide therapy. Generally, a conventional radionuclide is produced by a series of production process in which an irradiation treatment and a separation refinement treatment are sequentially performed. In the conventional production process, targets including a raw nuclide are collectively subjected to the irradiation treatment, and thereafter, are collectively subjected to the separation refinement treatment.

However, in the conventional series of production process, there has been a problem that it is difficult to stably supply the radionuclide at arbitrary timing. Moreover, in the conventional series of production process, there has been a problem that it is difficult to efficiently supply a predetermined amount of radionuclide at predetermined timing.

The separation refinement treatment requires a plurality of steps, and for this reason, takes time. In some cases, after having been generated by the irradiation treatment, the radionuclide decreases due to radioactive decay. Moreover, in some cases, after a raw nuclide has been nuclear-transformed into a daughter nuclide, a radionuclide is produced by radioactive decay of the daughter nuclide into a progeny nuclide. In a case of using the radioactive decay, it takes time to generate the progeny nuclide after the irradiation treatment.

In the conventional series of production process, production start timing needs to be set by back calculation in consideration of, e.g., the length of the time required for such a treatment and the half-life of the radionuclide, and timing at which the radionuclide can be supplied is limited. For this reason, there has been a problem that it is difficult to stably supply the radionuclide at arbitrary timing. Only one production request can be handled, and it is difficult to add or change supply timing after the start of production of the radionuclide.

In the conventional series of production process, one or more targets are processed in series, and for this reason, the irradiation treatment is inevitably stopped during the separation refinement treatment. Moreover, the separation refinement treatment is inevitably stopped during the irradiation treatment. The stop of any of these treatments leads to a problem that the rate of operation of the production system is degraded. Particularly, when the irradiation treatment is stopped, the amount of radionuclide produced per unit time decreases.

In the conventional series of production process, in order to supply a predetermined amount of radionuclide, production needs to be started after a predetermined amount of raw nuclide has been prepared. Since the irradiation treatment is collectively performed on the raw nuclide, there has been a problem that the rate of transformation from the raw nuclide to a desired radionuclide is degraded. In a case of collectively performing the irradiation treatment, it is difficult to uniformly nuclear-transform the entirety of the raw nuclide. An unreacted raw nuclide tends to remain, leading to an increase in the production cost.

On the other hand, according to the radionuclide production system 1 and the radionuclide production method using this system, the plurality of targets 40 is divided into the irradiation target group 40*a* and the refinement target group 40*b*, and the irradiation treatment and the separation refinement treatment are performed in parallel at the same timing. Thus, the radionuclide can be supplied at arbitrary timing. Even in a case where the supply timing is added or changed after the start of production of the radionuclide, such a situation can be flexibly handled. Since the irradiation treatment and the separation refinement treatment are performed in parallel at the same timing, the radionuclide can be continuously supplied and the amount of radionuclide produced per unit time can be improved.

Since the irradiation treatment and the separation refinement treatment are sequentially performed in the conventional series of production process, the time which can be used for the irradiation treatment decreases and the amount of desired radionuclide produced per unit time decreases in a case where the frequency of the separation refinement treatment increases. In a case of processing one target by this series of process, the frequency of recovery of the radionuclide per predetermined period by the separation refinement treatment and the amount of radionuclide generated per predetermined time by the irradiation treatment are in a trade-off relationship.

However, the irradiation treatment and the separation refinement treatment are performed in parallel at the same timing so that the radionuclide production amount can be controlled by selection of the target condition such as the number, distribution, and arrangement of the targets 40 and the condition for irradiation with the particle beam 11. The amount of radionuclide generated per predetermined time can be maximized while the frequency of recovery of the radionuclide is increased, and therefore, an on-demand supply in which a desired radionuclide supply amount is supplied at arbitrary desired supply timing is allowed. Moreover, as compared to a case of collectively performing the irradiation treatment under a predetermined irradiation condition, the rate of transformation of the raw nuclide and the amount of radionuclide produced per unit raw material amount can be improved. Thus, according to the radionuclide production system 1 and the radionuclide production method using this system, the amount of radionuclide produced per unit time and per unit raw material amount can be improved, and the radionuclide can be supplied with less excess and deficiency when the radionuclide is required.

According to the radionuclide production system 1 and the radionuclide production method using this system, in a case of irradiating the raw nuclide included in the target 40 with the bremsstrahlung radiation, the nuclear reaction of the raw nuclide included in the plurality of targets 40 can be made using the penetrating power of the bremsstrahlung radiation. Due to improvement in the rate of transformation of the raw nuclide, a great amount of raw nuclide can be nuclear-transformed by one irradiation treatment, and therefore, the desired radionuclide production amount can be efficiently increased.

According to the radionuclide production system 1 and the radionuclide production method using this system, the irradiation treatment with the particle beam 11 is simultaneously performed on the one or more targets 40 forming the irradiation target group 40*a*, and therefore, heat removal from the individual targets 40 is facilitated. The target 40 is made of, e.g., metal having a high thermal conductivity so that heat can be efficiently removed from the raw material including the raw nuclide. Moreover, a heat exchange medium such as air or coolant is supplied to between the targets 40 so that heat can be efficiently removed from the raw material including the raw nuclide.

According to the radionuclide production system 1 and the radionuclide production method using this system, the transportable target 40 is used so that the raw material including the raw nuclide can be easily sealed. Even in a case of generating a gaseous radioactive substance such as Rn-222, leakage of the radioactive substance can be prevented, and therefore, delivery of the target 40 and change in the arrangement of the targets 40 can be facilitated. Since delivery between the irradiation portion 20 and the separation refinement apparatus 30 is facilitated, the system can be formed with a simple structure. This leads to size and cost reduction in the system.

According to the radionuclide production system 1 and the radionuclide production method using this system, the desired radionuclide production amount can be improved by selection of the target condition such as the number, configuration, and arrangement of the targets 40 and the condition for irradiation with the particle beam 11, and therefore, the usage of the raw nuclide can be reduced. With reduction in the usage of the raw nuclide, a by-product of a radioactive substance such as Rn-222 is also reduced. Thus, e.g., a structure for sealing the raw nuclide or a filter apparatus that traps radioactive gas therein can be simplified and reduced in size. This leads to size and cost reduction in the system.

Second Embodiment

FIG. 6 is a diagram showing the configuration of a radionuclide production system according to a second embodiment.

As shown in FIG. 6, the radionuclide production system 2 according to the second embodiment includes a particle beam irradiation apparatus 10, an irradiation portion 20, a separation refinement apparatus 30, a plurality of targets 40, and a control apparatus 50. The plurality of targets 40 is divided into an irradiation target group 40*a* and a refinement target group 40*b*.

The radionuclide production system 2 is different from the radionuclide production system 1 in that the control apparatus 50 is provided and selects at least one of a target condition in an irradiation treatment and a separation refinement treatment or a condition for irradiation with a particle beam 11. The target condition or the condition for irradiation with the particle beam 11 is selected in every treatment performed in units of predetermined time. Other configurations of the radionuclide production system 2 are similar to those of the radionuclide production system 1.

A radionuclide production method using the radionuclide production system 2 includes a step of selecting at least one of the target condition in the irradiation treatment and the separation refinement treatment or the condition for irradiation with the particle beam 11, a step of arranging the plurality of targets 40 with the targets 40 divided into the irradiation target group 40*a* and the refinement target group 40*b* based on a selection result, a step of performing the irradiation treatment based on the selection result, and a step of performing the separation refinement treatment based on the selection result.

As the target condition, one or more of the number of targets 40 of the irradiation target group 40*a*, the number of targets 40 of the refinement target group 40*b*, the configuration of the target 40 of the irradiation target group 40*a*, the configuration of the target 40 of the refinement target group 40*b*, and the arrangement of the targets 40 of the irradiation target group 40*a* can be selected. These conditions can be changed in every treatment.

The control apparatus 50 includes, e.g., a controller that controls the irradiation treatment and the separation refinement treatment, a communication system that communicates with, e.g., the particle beam irradiation apparatus 10 and the separation refinement apparatus 30, an interface for performing operation, an arithmetic system that performs simulation, a storage apparatus that stores a target condition history and an irradiation condition history, and a safety system that performs a diagnosis and issues a warning.

The control apparatus 50 can have a function of selecting at least one of the target condition in the irradiation treatment and the separation refinement treatment or the condition for irradiation with the particle beam 11. The control apparatus 50 can control, e.g., the condition for the irradiation treatment and the separation refinement treatment and delivery of the target 40 based on the selection result such that a desired radionuclide amount is produced in every treatment performed in units of predetermined time.

The number of targets 40 subjected to the irradiation treatment and the number of targets 40 subjected to the separation refinement treatment mean the number of targets of the irradiation target group 40*a* per treatment and the number of targets 40 of the refinement target group 40*b* per treatment. In a case where the total number of targets 40 utilized in the system is fixed to a certain number, when the number of targets 40 subjected to one treatment is selected, the number of targets 40 subjected to the other treatment is inevitably set. The number of targets 40 subjected to the irradiation treatment and the number of targets 40 subjected to the separation refinement treatment can be selected according to, e.g., a desired radionuclide supply amount.

The configuration of the target 40 of the irradiation target group 40*a* and the configuration of the target 40 of the refinement target group 40*b* mean the configuration of the individual target 40 forming the irradiation target group 40*a* and the configuration of the individual target 40 forming the refinement target group 40*b*. Each individual target 40 can be assigned to the irradiation treatment or the separation refinement treatment in every treatment. The treatment history varies according to the individual target 40, and therefore, the amount of raw nuclide included in the target 40 and the amount of radionuclide generated by nuclear reaction in the target 40 vary according to the individual target 40.

The arrangement of the targets 40 subjected to the irradiation treatment means the order of arrangement of the targets 40 in the irradiation portion 20 in which the targets 40 are arranged so as to overlap with each other along the direction of irradiation with the particle beam 11. For each treatment and each individual target 40, the arrangement in the direction of irradiation with the particle beam 11 can be selected according to the amount of raw nuclide in each target 40 and the amount of radionuclide generated by the nuclear reaction in each target 40. For example, the greater the amount of unreacted raw nuclide is, the closer the target 40 can be arranged to an incident side in the direction of irradiation with the particle beam 11.

The condition for irradiation with the particle beam 11 means a condition such as the acceleration voltage of the particle beam irradiation apparatus 10, a beam current, and an irradiation time. For each treatment, the energy of the particle beam 11 emitted from the particle beam irradiation apparatus 10 and the irradiation amount of the particle beam 11 can be selected. For example, the higher the acceleration voltage is, the more the particle beam 11 can penetrate the target 40 to make the nuclear reaction in the plurality of targets 40. Moreover, as the beam current and the irradiation time increase, the amount of radionuclide generated by the nuclear reaction in each target 40 can be increased.

The target condition and the condition for irradiation with the particle beam 11 can be selected for each treatment such that the amount of radionuclide separated and refined from the target 40 of the refinement target group 40*b* per treatment performed in units of predetermined time reaches a preset desired production amount. As the desired production amount, an arbitrary desired separation refinement amount can be set in advance according to, e.g., a predetermined production request and a trend in demand for the radionuclide.

The amount of radionuclide separated and refined from the target 40 of the refinement target group 40*b* depends on a current target state, the target condition in the irradiation treatment and the separation refinement treatment, and the condition for irradiation with the particle beam 11. The target state is the state of each target 40 utilized in the system, and means a state regarding the amount of radionuclide generated by the nuclear reaction in the target 40, the amount of unreacted raw nuclide included in the target 40, and the amount of progeny nuclide generated by radioactive decay of a daughter nuclide generated by nuclear reaction of the raw nuclide included in the target 40.

The target condition and the condition for irradiation with the particle beam 11 may be selected based on measurement of the amount of radionuclide separated and refined from the target 40, or may be selected based on prediction by simulation of the amount of radionuclide to be separated and refined from the target 40. The current target state can be obtained in any case, and therefore, the predicted amount of radionuclide to be separated and refined per treatment in a next treatment can be obtained.

The amount of radionuclide separated and refined from the target 40 can be measured by a gamma counter using, e.g., a scintillation detector or a semiconductor detector. A measurement result of the radionuclide amount can be manually input to the control apparatus 50, or can be input to the control apparatus 50 from, e.g., a detector. The current target state is actually measured based on measurement, and therefore, the predicted amount of radionuclide to be separated and refined per treatment in the next treatment can be accurately obtained.

The prediction by the simulation of the amount of radionuclide to be separated and refined from the target 40 can be performed by particle beam/radiation simulation by a Monte Carlo method. For example, an EGS code may be used as a calculation code for analyzing a bremsstrahlung radiation. A prediction result of the radionuclide amount can be manually input to the control apparatus 50, or can be input to the control apparatus 50 from, e.g., the arithmetic system. Based on the prediction by the simulation, the predicted amount of radionuclide to be separated and refined per treatment in the next treatment can be obtained without actual measurement of the current target state.

The control apparatus 50 calculates, in the step of selecting the target condition or the irradiation condition, the predicted amount of radionuclide to be separated and refined from the target 40 of the refinement target group 40*b* per treatment based on the current target state, the temporarily-set target condition, and the temporarily-set condition for irradiation with the particle beam 11.

The predicted amount of radionuclide to be separated and refined per treatment means the predicted amount of desired radionuclide to be separated and refined from the target 40 of the refinement target group 40*b* per treatment performed in units of predetermined time under the temporarily-set target condition and the temporarily-set condition for irradiation with the particle beam 11. When the predicted amount of radionuclide to be separated and refined per treatment is obtained, comparison with the preset desired radionuclide production amount per treatment is allowed, and therefore, it can be evaluated whether the temporarily-set condition is proper.

The predicted amount of radionuclide to be separated and refined per treatment can be predicted by the particle beam/radiation simulation by the Monte Carlo method. For example, an EGS code may be used as a calculation code for analyzing the bremsstrahlung radiation. In the particle beam/radiation simulation, the current amount of raw nuclide in each target 40 is input as an initial value with reference to the current target state. The target state after the next treatment is predicted from the current target state under the temporarily-set target condition and the temporarily-set condition for irradiation with the particle beam 11.

In a case where the target condition and the condition for irradiation with the particle beam 11 are adjusted based on measurement of the amount of radionuclide separated and refined from the target 40, the amount of radionuclide separated and refined from the target 40 is measured in every treatment, and such a measurement result is referred as the current target state. The radionuclide amount is measured based on the amount of raw nuclide included in each target 40, the amount of radionuclide generated by the nuclear transformation of the raw nuclide included in each target 40, or both. When either one of these amounts is measured, the other amount can also be obtained based on a reaction path.

On the other hand, in a case where the target condition and the condition for irradiation with the particle beam 11 are adjusted based on the prediction by the simulation of the amount of radionuclide to be separated and refined from the target 40, the amount of radionuclide to be separated and refined from the target 40 is estimated based on a target condition history and an irradiation condition history up to the present, and such an estimation result is referred to as the current target state. The radionuclide amount is estimated by the particle beam/radiation simulation. The amount of raw nuclide in a previous treatment is input as an initial value, and the current target state is estimated under a previous target condition and a previous condition for irradiation with the particle beam 11.

The target condition history is the history of the target condition in each treatment on the target 40 up to the present. The irradiation condition history is the history of the condition for irradiation with the particle beam 11 in each treatment on the target 40 up to the present. The target condition history and the irradiation condition history preferably include at least information on the previous treatment and more preferably include information on the treatment from the start of production of the radionuclide. The data on the target condition history includes one or more pieces of history data indicating the number of targets 40 of the irradiation target group 40*a*, the number of targets 40 of the refinement target group 40*b*, the configuration of the target of the irradiation target group 40*a*, the configuration of the target of the refinement target group 40*b*, and the arrangement of the targets 40 of the irradiation target group 40*a*.

The target condition history data and the irradiation condition history data can be stored, e.g., in the storage apparatus of the control apparatus 50. The target condition data and the irradiation condition data can be collected to the control apparatus 50, e.g., from measurement equipment in every treatment, and can be saved as time-series history data. The individual targets 40 utilized in the system are distinguished from each other according to these pieces of data. For example, an optically-readable identifier can be assigned to each target 40.

The predicted amount of radionuclide to be separated and refined per treatment can be obtained with the target condition temporarily set under a predetermined condition for irradiation with the particle beam 11 in the particle beam/radiation simulation. Alternatively, under a predetermined target condition, the predicted amount can be obtained with the condition for irradiation with the particle beam 11 temporarily set. Alternatively, prediction under an optimal condition can be performed by combination or repetition of these types of simulation.

The predicted amount of radionuclide to be separated and refined per treatment can also be obtained by machine learning by AI. The target condition data and the irradiation condition data can be collected to the control apparatus 50, e.g., from the measurement equipment in every treatment together with data indicating the measurement result of the amount of radionuclide separated and refined from the target 40, and a machine learning data set can be formed therefrom. The control apparatus 50 may perform, based on the data set collected up to the present, supervised or unsupervised machine learning regarding a correlation between such data and the amount of radionuclide separated and refined from each target 40, thereby obtaining the predicted radionuclide separation refinement amount.

Subsequently, the control apparatus 50 compares a preset desired amount of radionuclide to be separated and refined per treatment and the predicted amount of radionuclide to be separated and refined per treatment with each other. The desired amount of radionuclide to be separated and refined per treatment may be input to the control apparatus 50 according to, e.g., the predetermined production request and the trend in demand for the radionuclide, or may be calculated by the control apparatus 50 by demand prediction using machine learning by AI.

Upon comparison, the amount of decrease in the radionuclide per treatment due to radioactive decay can be added to the predicted amount of radionuclide to be separated and refined per treatment, or can be subtracted from the desired amount of radionuclide to be separated and refined per treatment. By such calculation, even in a case where the radionuclide generated by the nuclear reaction decreases due to the radioactive decay, a required radionuclide production amount can be more reliably ensured.

As a result of comparison, when the absolute value of a difference between the predicted amount of radionuclide to be separated and refined per treatment and the desired amount of radionuclide to be separated and refined per treatment is a preset threshold or more, the desired radionuclide production amount cannot be produced with less excess and deficiency in the next treatment, and therefore, the temporarily-set target condition and irradiation condition are changed. Then, the predicted amount of radionuclide to be separated and refined per treatment is calculated again based on the changed target condition and irradiation condition, and is compared again with the desired amount of radionuclide to be separated and refined per treatment.

On the other hand, when the absolute value of the difference between the predicted separation refinement amount per treatment and the desired separation refinement amount per treatment is less than the preset threshold, the desired radionuclide production amount can be produced with less excess and deficiency in the next treatment, and therefore, the temporarily-set target condition and irradiation condition can be employed. The control apparatus 50 selects the target condition and irradiation condition which can be employed, and controls the next irradiation treatment and the separation refinement treatment.

The target condition and the irradiation condition are selected as described above so that the amount of radionuclide to be separated and refined from the target 40 of the refinement target group 40_b_ can be adjusted to an arbitrary preset desired production amount. The amount of radionuclide to be separated and refined from the target 40 is optimized in every treatment, and therefore, the radionuclide production amount can be maximized within a production capacity range and the radionuclide can be supplied with less excess and deficiency when the radionuclide is required.

The control apparatus 50 can have a function of detecting an abnormality in the treatment in addition to the function of selecting at least one of the target condition in the irradiation treatment and the separation refinement treatment or the condition for irradiation with the particle beam 11. The abnormality in at least one of the irradiation treatment or the separation refinement treatment can be diagnosed during production of the radionuclide, and the treatment can be stopped in a case where the abnormality is confirmed.

The abnormality in the treatment includes, e.g., an error in a work in the irradiation treatment or the separation refinement treatment and a failure in equipment such as the particle beam irradiation apparatus 10, the irradiation portion 20, the separation refinement apparatus 30, or the target 40. In a case where the abnormality in the treatment has been caused, e.g., improper arrangement of the targets 40, a change in the condition for irradiation with the particle beam 11, or a decrease in the radionuclide due to leakage is caused, and the desired amount of radionuclide to be separated and refined from the target 40 deviates from the predicted amount. Such fluctuation is determined so that the abnormality in the treatment can be detected.

The control apparatus 50 measures, in the step of performing the separation refinement treatment based on the selection result, the amount of radionuclide separated and refined from the target 40 in every treatment. The radionuclide amount can be measured by the gamma counter using, e.g., the scintillation detector or the semiconductor detector. Based on the measurement result of the radionuclide amount, the current amount of radionuclide separated and refined per treatment is obtained.

Subsequently, the control apparatus 50 compares the measured current amount of radionuclide separated and refined per treatment and the predicted amount of radionuclide to be separated and refined per treatment with each other. The current amount of radionuclide separated and refined per treatment can be input to the control apparatus 50, e.g., from the measurement equipment. The predicted amount of radionuclide to be separated and refined per treatment may be obtained by the particle beam/radiation simulation under the temporarily-set target condition and irradiation condition, or may be obtained by machine learning by AI based on the data set.

As a result of comparison, when the absolute value of a difference between the predicted amount of radionuclide to be separated and refined per treatment and the measured current amount of radionuclide separated and refined per treatment is a preset threshold or more, the separation refinement amount predicted by the simulation and the measured separation refinement amount deviate from each other, and therefore, it is determined that there is the abnormality in the irradiation treatment or the separation refinement treatment. In this case, a warning indicating occurrence of the abnormality is displayed, and the irradiation treatment and the separation refinement treatment are stopped.

On the other hand, when the absolute value of the difference between the predicted amount of radionuclide to be separated and refined per treatment and the measured current amount of radionuclide separated and refined per treatment is less than the preset threshold, the separation refinement amount predicted by the simulation and the measured separation refinement amount do not deviate from each other, and therefore, it is determined that there is no abnormality in the irradiation treatment or the separation refinement treatment treatment. In this case, the target condition and irradiation condition which can be employed can be selected, and the irradiation treatment and the separation refinement treatment can be continued.

According to the radionuclide production system 2 and the radionuclide production method using this system, one or more of the number of targets 40 subjected to the irradiation treatment, the number of targets 40 subjected to the separation refinement treatment, the configuration of the target 40 of the irradiation target group 40*a*, the configuration of the target 40 of the refinement target group 40*b*, the arrangement of the targets 40 subjected to the irradiation treatment, and the condition for irradiation with the particle beam 11 can be selected in every treatment according to the desired radionuclide production amount. These target and irradiation conditions are selected based on the current target state, and therefore, an optimal condition can be employed for each individual target 40 according to the previous treatment history. Even in a case where a future demand fluctuates, the radionuclide production amount can be adjusted while the radionuclide is produced at short time intervals, and therefore, an economical on-demand supply is allowed. Moreover, these target and irradiation conditions can be adjusted under a predetermined raw nuclide usage, and therefore, the radionuclide production amount per raw nuclide usage can be improved. Thus, according to the radionuclide production system 2 and the radionuclide production method using this system, the amount of radionuclide produced per unit time and per unit raw material amount can be improved and the radionuclide can be supplied with less excess and deficiency when the radionuclide is required.

According to the radionuclide production system 2 and the radionuclide production method using this system, the arrangement of the targets 40 subjected to the irradiation treatment can be changed in every treatment. The arrangement of the targets 40 in the direction of irradiation with the particle beam 11 is changed so that unevenness in the amount of radionuclide generated by the nuclear reaction can be reduced. For example, a new target 40 can be arranged closest to the incident side in the direction of irradiation with the particle beam 11, and a great amount of radionuclide can be generated accordingly. The unevenness in the radionuclide generation amount is reduced so that more-accurate simulation can be performed, and therefore, the radionuclide can be supplied with much less excess and deficiency when the radionuclide is required.

According to the radionuclide production system 2 and the radionuclide production method using this system, the amount of radionuclide produced per treatment can be compared between the prediction result obtained by the simulation and the measurement result obtained by the actual measurement, and therefore, the abnormality in the irradiation treatment or the separation refinement treatment can be diagnosed based on the amount of radionuclide produced per treatment. The amount of radionuclide produced per treatment reflects an erroneous process in the irradiation treatment or the separation refinement treatment and a device failure, and therefore, the abnormality can be promptly detected at an initial stage.

The embodiments of the present invention have been described above, but the present invention is not limited to the above-described embodiments and various changes can be made without departing from the gist of the present invention. For example, the present invention is not limited to one including all the configurations of the above-described embodiments. Some configurations of a certain embodiment can be replaced with other configurations, some configurations of a certain embodiment can be added to another embodiment, and some configurations of a certain embodiment can be omitted.

REFERENCE SIGNS LIST

1: Radionuclide production system
2: Radionuclide production system
10: Particle beam irradiation apparatus
20: Irradiation portion
30: Separation refinement apparatus
40: Target
40*a*: Irradiation target group
40*b*: Refinement target group
50: Control apparatus

The invention claimed is:

1. A radionuclide production system for generating, separating, and refining a radionuclide, comprising:
- a particle beam irradiation apparatus that generates a particle beam;
- a plurality of targets, which are solids, that generate the radionuclide by irradiation with the particle beam in an irradiation treatment; and
- a separation refinement apparatus that separates and refines a portion of the plurality of the targets in which a predetermined radionuclide has been generated from the irradiation with the particle beam,
- wherein the plurality of targets are physically divided into an irradiation target group and a refinement target group being the portion of the plurality of the targets in which the predetermined radionuclide has been generated and which are subjected to a separation refinement treatment of separating and refining the radionuclide from the portion of the plurality targets in the refinement target group, and
- wherein the irradiation target group and the refinement target group are processed in parallel.

2. The radionuclide production system according to claim 1, further comprising:
- a control apparatus that selects a target condition in the irradiation treatment and the separation refinement treatment or a condition for the irradiation with the particle beam,
- wherein the target condition is one or more of the number of targets of the irradiation target group, the number of targets of the refinement target group, a configuration of each target of the irradiation target group, a configuration of each target of the refinement target group, and arrangement of the targets of the irradiation target group, and
- wherein the control apparatus is configured to select the target condition or the irradiation condition based on a measured amount of radionuclide separated and refined from each target of the refinement target group.

3. The radionuclide production system according to claim 2, wherein the control apparatus is configured to:

refer to a measurement result of an amount of raw nuclide included in each target or an amount of radionuclide generated by nuclear transformation of the raw nuclide, and select the target condition or the irradiation condition such that the measured amount of radionuclide separated and refined from each target of the refinement target group reaches a preset desired radionuclide production amount.

4. The radionuclide production system according to claim 1, further comprising:

a control apparatus that selects a target condition in the irradiation treatment and the separation refinement treatment or a condition for the irradiation with the particle beam, wherein the target condition is one or more of the number of targets of the irradiation target group, the number of targets of the refinement target group, a configuration of each target of the irradiation target group, a configuration of each target of the refinement target group, and arrangement of the targets of the irradiation target group, and wherein the control apparatus is configured to select the target condition or the irradiation condition based on a history of the irradiation treatment and the separation refinement treatment to which the targets are subjected.

5. The radionuclide production system according to claim 4, wherein the control apparatus is configured to:

estimate an amount of raw nuclide included in each target or an amount of radionuclide generated by nuclear transformation of the raw nuclide based on the history of the irradiation treatment and the separation refinement treatment to which the targets are subjected, predict an amount of radionuclide to be separated and refined from each target of the refinement target group based on the estimated raw nuclide amount or the estimated radionuclide amount, and select the target condition or the irradiation condition such that the predicted amount of radionuclide to be separated and refined from each target of the refinement target group reaches a preset desired radionuclide production amount.

6. The radionuclide production system according to claim 1, further comprising:

a control apparatus that detects an abnormality in the irradiation treatment or the separation refinement treatment, wherein the control apparatus detects the abnormality in the irradiation treatment or the separation refinement treatment based on a history of the irradiation treatment and the separation refinement treatment to which the targets are subjected and a measured amount of radionuclide separated and refined from each target of the refinement target group.

7. The radionuclide production system according to claim 6, wherein the control apparatus is configured to:

estimate an amount of raw nuclide included in each target or an amount of radionuclide generated by nuclear transformation of the raw nuclide based on the history of the irradiation treatment and the separation refinement treatment to which the targets are subjected, predict an amount of radionuclide to be separated and refined from each target of the refinement target group based on the estimated raw nuclide amount or the estimated radionuclide amount, and determine that there is the abnormality in the irradiation treatment or the separation refinement treatment when a difference between the predicted amount of radionuclide to be separated and refined from each target of the refinement target group and the measured amount of radionuclide separated and refined from each target of the refinement target group is a threshold or more.

8. The radionuclide production system according to claim 1, wherein the particle beam irradiation apparatus is an electron linear accelerator.

9. The radionuclide production system according to claim 1, wherein the radionuclide production system produces actinium 225 (Ac-225).

10. The radionuclide production system according to claim 1, wherein the number of targets is 10 or less.

11. A radionuclide production method for generating, separating, and refining a radionuclide, comprising:

an irradiation treatment of generating the radionuclide in a plurality of targets, which are solids, by irradiation with a particle beam in an irradiation treatment; and a separation refinement treatment of separating and refining a portion of the plurality of the targets in which a predetermined radionuclide has been generated from the irradiation with the particle beam;

wherein the plurality of targets physically divided into an irradiation target group and a refinement target group being the portion of the plurality of the targets in which the predetermined radionuclide has been generated and which are subjected to the separation refinement treatment; and processing the irradiation target group and the refinement target group in parallel to produce the radionuclide.

* * * * *